(12) United States Patent
Uchida

(10) Patent No.: US 9,819,400 B2
(45) Date of Patent: *Nov. 14, 2017

(54) COMMUNICATION DEVICE, COMMUNICATION SYSTEM, AND COMMUNICATION METHOD

(71) Applicant: Sony Semiconductor Solutions Corporation, Kanagawa (JP)

(72) Inventor: Shigenori Uchida, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 12 days.

This patent is subject to a terminal disclaimer.

(21) Appl. No.: 15/137,655

(22) Filed: Apr. 25, 2016

(65) Prior Publication Data

US 2016/0241305 A1 Aug. 18, 2016

Related U.S. Application Data

(63) Continuation of application No. 14/633,385, filed on Feb. 27, 2015, now Pat. No. 9,351,103.

(30) Foreign Application Priority Data

Mar. 17, 2014 (JP) .................................. 2014-053567

(51) Int. Cl.
*H04B 5/00* (2006.01)
*H04W 4/00* (2009.01)
(Continued)

(52) U.S. Cl.
CPC ............. *H04B 5/005* (2013.01); *H01P 3/127* (2013.01); *H01P 3/16* (2013.01); *H04B 5/0012* (2013.01); *H04B 5/0075* (2013.01); *H04W 4/008* (2013.01)

(58) Field of Classification Search
USPC ........ 455/40, 41.1, 41.2, 63.1, 67.11, 67.15; 343/772, 773, 785, 786
See application file for complete search history.

(56) References Cited

U.S. PATENT DOCUMENTS 5,754,948 A * 5/1998 Metze ...................... H04B 7/00
455/41.2
6,366,723 B1 * 4/2002 Medved ............. H04B 10/2581
385/39
(Continued)

FOREIGN PATENT DOCUMENTS

JP 2002-016166 1/2002
WO WO-2012/155135 A2 11/2012

OTHER PUBLICATIONS

Japanese Office Action dated Feb. 14, 2017 for corresponding Japanese Application No. 2014-053567.

*Primary Examiner* — Tuan A Tran
(74) *Attorney, Agent, or Firm* — Michael Best & Friedrich LLP

(57) ABSTRACT

A communication device includes transmission paths on a plurality of channels, operable to transmit a signal between the communication device and a communication partner device in communication with the communication device in such a manner that the communication device and the communication partner device are brought into contact with or in close proximity to each other. Electric fields of signals in the transmission paths on the plurality of channels are oriented orthogonal to each other.

21 Claims, 4 Drawing Sheets

(51) Int. Cl.
H01P 3/127 (2006.01)
H01P 3/16 (2006.01)

(56) References Cited

U.S. PATENT DOCUMENTS

| | | | | |
|---|---|---|---|---|
| 6,967,347 B2* | 11/2005 | Estes | ................. | B82Y 10/00 |
| | | | | 257/25 |
| 7,126,151 B2* | 10/2006 | Estes | ................. | B82Y 10/00 |
| | | | | 257/25 |
| 7,151,497 B2* | 12/2006 | Crystal | ................. | H01Q 9/16 |
| | | | | 343/747 |
| 7,860,399 B2* | 12/2010 | Hsieh | ................. | H04B 10/40 |
| | | | | 398/151 |
| 8,238,824 B2* | 8/2012 | Washiro | ................. | H04B 5/00 |
| | | | | 343/745 |
| 2011/0167180 A1 | 7/2011 | Towell et al. | | |
| 2015/0147978 A1* | 5/2015 | Davis | ................. | G06F 1/1632 |
| | | | | 455/73 |

* cited by examiner

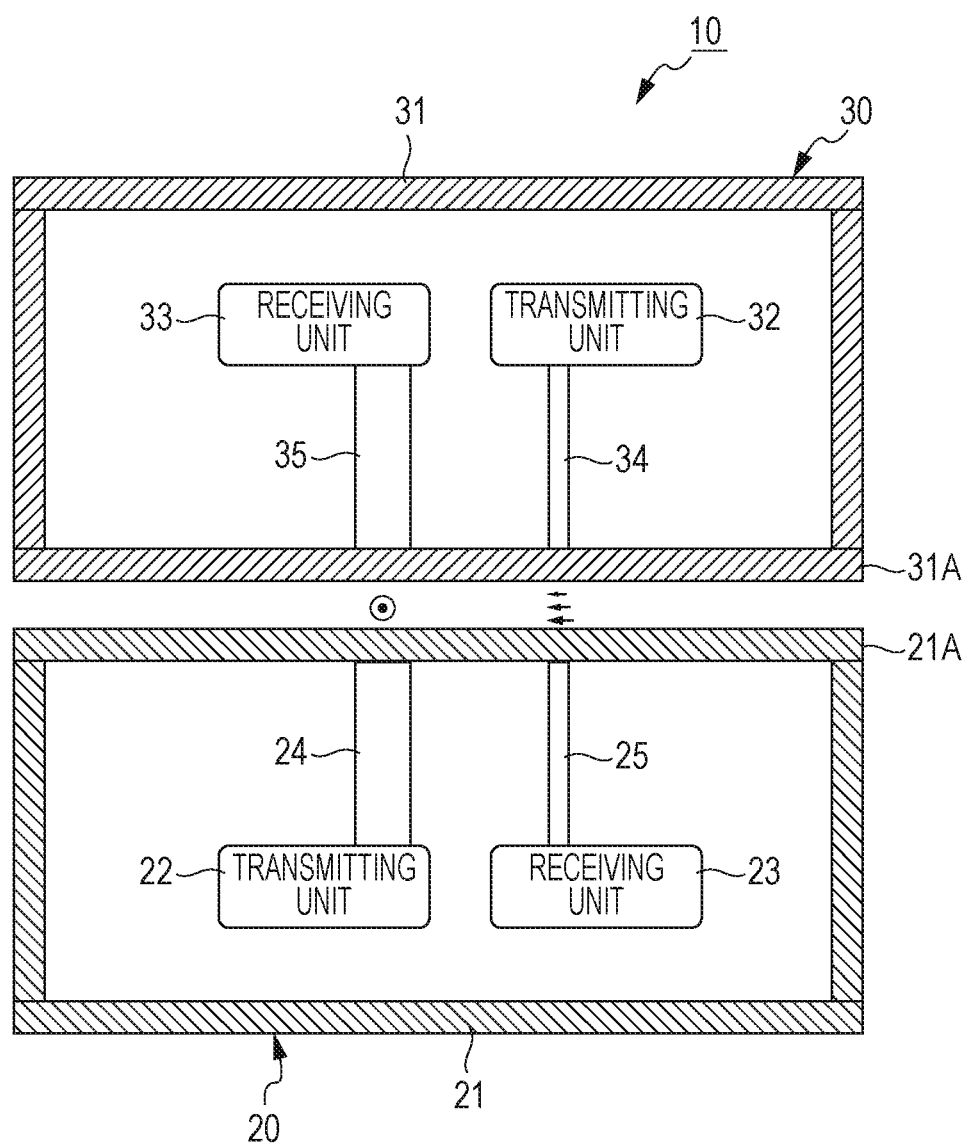

COMMUNICATION DEVICE, COMMUNICATION SYSTEM, AND COMMUNICATION METHOD

CROSS REFERENCE TO RELATED APPLICATIONS

This application is a Continuation application of application Ser. No. 14/633,385, filed Feb. 27, 2015 which claims the benefit of Japanese Priority Patent Application JP 2014-053567 filed Mar. 17, 2014, the entire contents of which are incorporated herein by reference.

BACKGROUND

The present disclosure relates to communication devices, communication systems, and communication methods, and more specifically to a communication device, a communication system, and a communication method for communication between communication partner devices in such a manner that the communication partner devices are brought into contact with or in close proximity to each other.

Ensuring that transmission paths on a plurality of channels are isolated from one another is desirable for communication between different communication devices (or apparatuses) via the transmission paths on the plurality of channels. In a technique of the related art, for example, in order to address signal interference between a transmit terminal and a receive terminal of a communication device, the communication device includes a resistor on a top surface of a wall that separates the transmit terminal from the receive terminal, and the presence of the resistor ensures that the transmit terminal and the receive terminal are isolated from each other (see, for example, Japanese Unexamined Patent Application Publication No. 2002-16166).

SUMMARY

In the technique of the related art described above, a special member, that is, a resistor, is used to ensure isolation. The resistor located on the top surface of the wall that separates the transmit terminal from the receive terminal may prevent the top surface of the communication device from being formed in a planar shape. Such a communication device is not suitable for use in a communication system for communication between different communication devices in such a manner that the planar surfaces of the housings of the communication devices are brought into contact with or in close proximity to each other.

Accordingly, it is desirable to provide a communication device, a communication system, and a communication method configured to ensure that transmission paths on a plurality of channels are isolated from one another without using any special member to ensure such isolation.

Accordingly, a communication device according to an embodiment of the present disclosure includes transmission paths on a plurality of channels that are operable to transmit a signal between the communication device and a communication partner device in communication with the communication device in such a manner that the communication device and the communication partner device are brought into contact with or in close proximity to each other. Electric fields of signals in the transmission paths on the plurality of channels are oriented orthogonal to each other.

A communication system according to another embodiment of the present disclosure includes a first communication device and a second communication device. The first communication device and the second communication device are configured to communicate with each other over transmission paths on a plurality of channels in such a manner that the first communication device and the second communication device are brought into contact with or in close proximity to each other. Electric fields of signals in the transmission paths on the plurality of channels are oriented orthogonal to each other.

A communication method according to still another embodiment of the present disclosure includes communicating a first communication device and a second communication device over transmission paths on a plurality of channels in such a manner that the first communication device and the second communication device are brought into contact with or in close proximity to each other. Electric fields of signals in the transmission paths on the plurality of channels are oriented orthogonal to each other.

In the communication device, communication system, or communication method having the configuration described above, the electric fields are defined in accordance with the propagation modes (or electromagnetic field distributions) in the plurality of transmission paths. Electric fields of signals in the transmission paths on the plurality of channels are oriented orthogonal to each other, ensuring that the transmission paths on the plurality of channels are isolated from one another without using any special member for propagation to one communication device with an electric field of a signal being oriented orthogonal to that for another communication device.

An embodiment of the present disclosure enables ensuring that transmission paths on a plurality of channels are isolated from one another without using any special member to ensure such isolation.

The above-described advantage is not intended to be limiting in any way, and the embodiment may include any of the advantages described herein. The advantages described herein are merely illustrative and are not intended to be limiting. Yet other embodiments may include further advantages.

BRIEF DESCRIPTION OF THE DRAWINGS

FIG. 1 is a plan view, including a cross section in part, illustrating an example configuration of a communication system according to an embodiment of the present disclosure;

DETAILED DESCRIPTION OF EMBODIMENTS

Figure 2A:
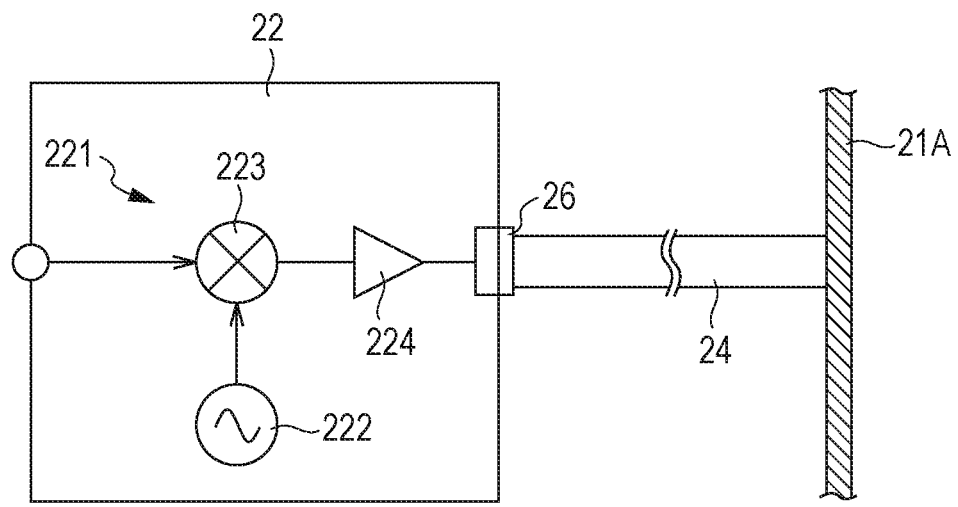
FIG. 2A is a block diagram illustrating a specific example configuration of a transmitting unit.

Some embodiments of the present disclosure will be described in detail with reference to the drawings. The techniques disclosed herein are not limited to those in the following embodiments, and a variety of values used in the embodiments are illustrative. In the following description, components having substantially the same configuration or substantially the same function are assigned the same reference numerals. Redundant description will be omitted. The description will be given in the following order.

1. General Description of Communication Device, Communication System, and Communication Method according to Embodiments of Present Disclosure 2. Communication System according to Embodiment of Present Disclosure 3. Modifications of Embodiment 4. Specific Example of Communication System according to Embodiment General Description of Communication Device, Communication System, and Communication Method According to Embodiments of Present Disclosure In a communication device, a communication system, and a communication method according to embodiments of the present disclosure, signals used for communication between communication partner devices (or different communication devices) may be high-frequency signals such as electromagnetic wave signals, in particular, microwave, millimeter wave, or terahertz wave signals. A communication device, a communication system, and a communication method using high-frequency signals is suitable for use in signal transmission between various devices such as electronic devices, information processing devices, and semiconductor devices, signal transmission between circuit substrates within one apparatus (or device), and the like.

In the communication device, communication system, and communication method having the preferred configuration described above, signals used for communication between communication partner devices (or different communication devices) are, preferably, millimeter-wave band signals among high-frequency signals. A millimeter-wave band signal is a radio signal having a frequency ranging from 30 GHz to 300 GHz (with a wavelength ranging from 1 mm to 10 mm). Signal transmission (or communication) in the millimeter-wave band enables achievement of Gbps-order (for example, 5 Gbps or more) high-speed signal transmission. Examples of signals desirable for use with Gbps-order high-speed signal transmission may include data signals for digital video for movies, computer images, and so forth. Another advantage of signal transmission in the millimeter-wave band is high immunity to interference. There is no interference with other electrical wiring of cable connections between devices.

In the communication device, communication system, and communication method having the preferred configuration described above, electric fields of signals in adjacent transmission paths among the transmission paths on the plurality of channels may be oriented orthogonal to each other. In addition, the communication device may communicate with the communication partner device in such a manner that the planar surface of the housing of the communication device is brought into contact with or in close proximity to that of the communication partner device. Each of the housings of the communication devices (or apparatuses) may be formed of a dielectric material, for example, a plastic material.

In the communication device, communication system, and communication method having the preferred configuration described above, the transmission paths on the plurality of channels may be waveguides. Each of the waveguides may have a rectangular or circular cross-section shape.

In the communication device, communication system, and communication method having the preferred configuration described above, transmission paths on at least two channels including a transmitter-side transmission path and a receiver-side transmission path may be provided, and the communication device may perform two-way communication with the communication partner device. In addition, electric fields of signals in the transmitter-side transmission path and the receiver-side transmission path may be oriented orthogonal to each other.

Communication System According to Embodiment of Present Disclosure

FIG. 1 is a plan view, including a cross section in part, illustrating an example configuration of a communication system according to an embodiment of the present disclosure. A communication system 10 according to this embodiment is configured such that different communication devices (or apparatuses), more specifically, a first communication device 20 and a second communication device 30, communicate with each other over transmission paths on a plurality of channels in such a manner that the communication devices are brought into contact with or in close proximity to each other. Each of the first communication device 20 and the second communication device 30 is a communication device according to an embodiment of the present disclosure.

The first communication device 20 has a housing 21 including a transmitting unit 22 and a receiving unit 23. The second communication device 30 also has a housing 31 including a transmitting unit 32 and a receiving unit 33. The housing 21 of the first communication device 20 and the housing 31 of the second communication device 30 have each a rectangular shape, for example, and are each formed of a dielectric material, for example, a plastic material having a thickness of approximately 2 mm.

In the communication system 10 including the first communication device 20 and the second communication device 30, preferably, the communication devices 20 and 30 communicate with each other using high-frequency signals, for example, millimeter-wave band signals, in such a manner that planar surfaces of the housings 21 and 31 of the communication devices 20 and 30 are brought into contact with or in close proximity to each other. The term "close proximity", as used herein, may be used to such an extent that the transmission range of millimeter-wave band signals is limited since the high-frequency signals are millimeter-wave band signals. Typically, communication devices having a shorter distance therebetween than communication devices used for broadcasting or general wireless communication are in a "close proximity" state. More specifically, the term "close proximity" refers to a state where the distance (or interval) between the first communication device 20 and the second communication device 30 is less than or equal to 10 cm, preferably, less than or equal to 1 cm.

The first communication device 20 includes, for example, a waveguide 24 between the output end of the transmitting unit 22 and an inner surface of a plastic plate 21A which is near the second communication device 30, and a waveguide 25 between the input end of the receiving unit 23 and the inner surface of the plastic plate 21A which is near the second communication device 30. The waveguides 24 and 25 form transmission paths on the first communication device 20 side. Also, the second communication device 30 includes, for example, a waveguide 34 between the output end of the transmitting unit 32 and an inner surface of a plastic plate 31A which is near the first communication device 20, and a waveguide 35 between the input end of the receiving unit 33 and the inner surface of the plastic plate 31A which is near the first communication device 20. The waveguides 34 and 35 form transmission paths on the second communication device 30 side. Accordingly, the first communication device 20 and the second communication device 30 have two-channel transmission paths, that is, the transmitter-side transmission paths (i.e., the waveguides 24 and 34) and the receiver-side transmission paths (i.e., the waveguides 25 and 35), achieving two-way communication.

The waveguides 24 and 25 allow transmission of millimeter-wave band signals to and from the second communication device 30. The waveguides 34 and 35 allow transmission of millimeter-wave band signals to and from the first communication device 20. In order to achieve transmission of millimeter-wave band signals, the waveguide 24 on the transmitter side of the first communication device 20 and the waveguide 35 on the receiver side of the second communication device 30 are arranged so that open-end surfaces of the waveguides 24 and 35 face each other, and the waveguide 25 on the receiver side of the first communication device 20 and the waveguide 34 on the transmitter side of the second communication device 30 are arranged so that open-end surfaces of the waveguides 25 and 34 face each other.

Examples of the type of waveguide may include a hollow waveguide and a dielectric waveguide. The waveguides 24 and 25 on the first communication device 20 side and the waveguides 34 and 35 on the second communication device 30 side may be either hollow waveguides or dielectric waveguides. A dielectric waveguide has higher flexibility than a hollow waveguide. In addition, a dielectric waveguide has a waveguide structure that provides transmission of a millimeter-wave band signal with the signal confined to the dielectric, and has a characteristic of efficient transmission of electromagnetic waves in the millimeter-wave range.

The waveguides 24 and 25 on the first communication device 20 side and the waveguides 34 and 35 on the second communication device 30 side may be dielectric waveguides. In this case, each of the dielectric waveguides may be, for example, a dielectric waveguide that contains a dielectric material having a relative dielectric constant in a certain range and a dielectric loss tangent in a certain range. The certain range may be such that the relative dielectric constant and dielectric loss tangent of the dielectric material are within a range over which the desired effect can be achieved, and the relative dielectric constant and dielectric loss tangent may be predetermined values in that range.

The characteristics of the dielectric waveguide are difficult to determine in accordance with only the dielectric material, and also depend on the transmission path length and the millimeter-wave band frequency (or wavelength). Thus, the relative dielectric constant and dielectric loss tangent of the dielectric material may not necessarily be clearly definable, but may be set as follows, by way of example.

In order to achieve high-speed millimeter-wave band signal transmission over a dielectric waveguide, desirably, the dielectric material has a relative dielectric constant of approximately 2 to 10 (preferably, 3 to 6) and a dielectric loss tangent of approximately 0.00001 to 0.01 (preferably, 0.00001 to 0.001). Examples of a dielectric material that meets the above-described conditions include an acrylic resin based material, an urethane resin based material, an epoxy resin based material, a silicone based material, a polyimide based material, and a cyanoacrylate resin based material.

The transmitting units 22 and 32 perform a process to convert a signal to be transmitted into a millimeter-wave band signal and to output the resulting signal to the waveguides 24 and 34, respectively. The receiving units 23 and 33 perform a process to receive a millimeter-wave band signal transmitted through the waveguides 25 and 35 and to return (or restore) the received signal to the original signal to be transmitted. The transmitting unit 22 has basically the same configuration as the transmitting unit 32, and the receiving unit 23 has basically the same configuration as the receiving unit 33. In the following, a description will be given of a specific configuration of the transmitting unit 22 and the receiving unit 23 as representatives.

Figure 2B:
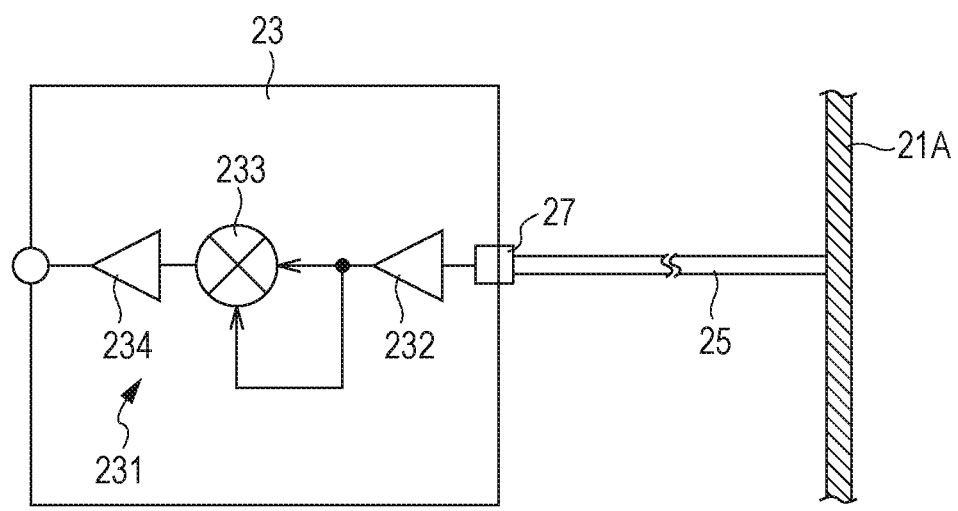
FIG. 2B is a block diagram illustrating a specific example configuration of a receiving unit.

FIG. 2A illustrates an example specific configuration of the transmitting unit 22, and FIG. 2B illustrates a specific example configuration of the receiving unit 23.

The transmitting unit 22 includes, for example, a signal generation unit 221 configured to process a signal to be transmitted to generate a millimeter-wave band signal. The signal generation unit 221 is a signal conversion unit configured to convert a signal to be transmitted into a millimeter-wave band signal, and is formed of, for example, an amplitude shift keying (ASK) modulation circuit. Specifically, the signal generation unit 221 is configured to multiply a millimeter-wave band signal given from an oscillator 222 and a signal to be transmitted by using a multiplier 223 to generate a millimeter-wave band ASK modulated wave signal, and to output the generated signal via a buffer 224.

A connector device 26 is provided between the transmitting unit 22 and the waveguide 24. The connector device 26 couples the transmitting unit 22 and the waveguide 24 to each other via, for example, capacitive coupling, electromagnetic-induction coupling, electromagnetic field coupling, resonator coupling, or the like. The waveguide 24 is disposed between the connector device 26 and the plastic plate 21A that defines the wall of the housing 21 which is near the second communication device 30 so that an open-end surface of the waveguide 24 comes into contact with an inner surface of the plastic plate 21A.

The receiving unit 23 includes, for example, a signal restoration unit 231 configured to process a millimeter-wave band signal given through the waveguide 25 to restore the original signal to be transmitted. The signal restoration unit 231 is a signal conversion unit configured to convert the received millimeter-wave band signal into the original signal to be transmitted, and is formed of, for example, a square-law detector circuit. Specifically, the signal restoration unit 231 is configured to convert a millimeter-wave band signal (ASK modulated wave) given through a buffer 232 into the original signal to be transmitted by squaring the given signal by using a multiplier 233, and to output the original signal to be transmitted via a buffer 234.

A connector device 27 is provided between the waveguide 25 and the receiving unit 23. The connector device 27 couples the waveguide 25 and the receiving unit 23 to each other via, for example, capacitive coupling, electromagnetic-induction coupling, electromagnetic field coupling, resonator coupling, or the like. The waveguide 25 is disposed between the plastic plate 21A that defines the wall of the housing 21 which is near the second communication device 30 and the connector device 27 so that an open-end surface of the waveguide 25 comes into contact with an inner surface of the plastic plate 21A.

As described above, the communication system 10 according to this embodiment is configured to provide communication between the first communication device 20 and the second communication device 30 using a millimeter-wave band signal in such a manner that the planar surfaces of the housing 21 and the housing 31 are brought into contact with or in close proximity to each other. More specifically, in the communication system 10 according to this embodiment, the first communication device 20 and the second communication device 30 each include a transmitting and receiving unit (i.e., the set of the transmitting unit 22 and the receiving unit 23, and the set of the transmitting unit 32 and the receiving unit 33), and perform two-way communication through two-channel transmission paths (i.e., the set of the waveguide 24 and the waveguide 25, and the set of the waveguide 34 and the waveguide 35).

The communication system 10 according to this embodiment provides communication using a millimeter-wave band signal as a high-frequency signal, called millimeter wave communication, and has the following advantages.

(a) Facilitate high data rate transmission because millimeter wave communication is featured by a wide communication bandwidth.

(b) Capable of separating the frequency used for transmission from frequencies for other baseband signal processing, causing frequency interference between millimeter-wave and baseband signals to be less likely to occur.

(c) Reduce the size of the coupling structure and waveguide structure, which are determined in accordance with the wavelength, since the millimeter-wave band has a short wavelength. In addition, the distance attenuation is large and the diffraction is small, resulting in facilitating electromagnetic shielding.

In particular, the communication system 10 according to this embodiment is a communication system configured such that, in millimeter wave communication, a transmission path of each of the first communication device 20 and the second communication device 30 has a waveguide structure including a waveguide and configured to provide communication between the first communication device 20 and the second communication device 30 in such a manner that the first communication device 20 and the second communication device 30 are brought into contact with or in close proximity to each other. Thus, the input of an extra signal from an external device may be suppressed. Since a complicated circuit, such as an arithmetic operation circuit, for removing an extra signal when the extra signal is input from an external device is no longer necessary, the size of the first communication device 20 and the second communication device 30 may be reduced accordingly.

For two-way communication between different communication devices by using full-duplex communication, it is desirable to ensure isolation in order to prevent or reduce signal interference between the transmitting unit 22 and the receiving unit 23 or between the transmitting unit 32 and the receiving unit 33 provided in each of the communication devices (i.e., the first communication device 20 or the second communication device 30). To that end, as in the communication system 10 according to this embodiment, ensuring the flatness of the planar surfaces of the housing 21 and the housing 31 is important for communication in such a manner that the planar surfaces of the housing 21 and the housing 31 are brought into contact with or in close proximity to each other.

For example, in a case where a communication system for two-way communication employs a waveguide structure including waveguides (24, 25, 34, and 35), the electric fields are defined in accordance with the propagation modes (or electromagnetic field distributions) in the waveguides. Thus, in the communication system 10 according to this embodiment having the configuration described above, each of the first communication device 20 and the second communication device 30 employs a configuration in which electric fields of signals in a transmitter-side transmission path and a receiver-side transmission path are oriented orthogonal to each other.

Specifically, in the first communication device 20, electric fields of signals in the waveguide 24 on the transmitter side and the waveguide 25 on the receiver side, that is, electric fields of signals in adjacent transmission paths, are oriented orthogonal to each other. In the second communication device 30, electric fields of signals in the waveguide 34 on the transmitter side and the waveguide 35 on the receiver side are oriented orthogonal to each other. More specifically, in the first communication device 20, the waveguide 24 on the transmitter side and the waveguide 25 on the receiver side are connected to the device end surface, or the inner surface of the plastic plate 21A of the housing 21 which is near the second communication device 30, so that the orientations of the electric fields in the waveguides 24 and 25 are orthogonal. Likewise, in the second communication device 30, the waveguide 34 on the transmitter side and the waveguide 35 on the receiver side are connected to the inner surface of the plastic plate 31A of the housing 31 which is near the first communication device 20 so that the orientations of the electric fields in the waveguides 34 and 35 are orthogonal.

In the manner described above, the waveguide 24 and the waveguide 25 are arranged so that electric fields of signals in a transmitter-side transmission path and a receiver-side transmission path are oriented orthogonal to each other, and the waveguide 34 and the waveguide 35 are arranged so that electric fields of signals in a transmitter-side transmission path and a receiver-side transmission path are oriented orthogonal to each other. This ensures that the transmitter-side transmission path and the receiver-side transmission path are isolated from each other without using any special member (or without using any special structure). No use of any special member ensures the flatness of the planar surfaces of the housing 21 and the housing 31, which is useful for a communication system configured to provide communication in such a manner that the planar surfaces of the housing 21 and the housing 31 are brought into contact with or in close proximity to each other. Furthermore, the techniques disclosed herein are suitable for use in the achievement of a full-duplex communication method of high-speed signal pairs, such as Universal Serial Bus (USB) 3.0 or Mobile Industry Processor Interface (MIPI®) m-PHY.

Figure 3A:
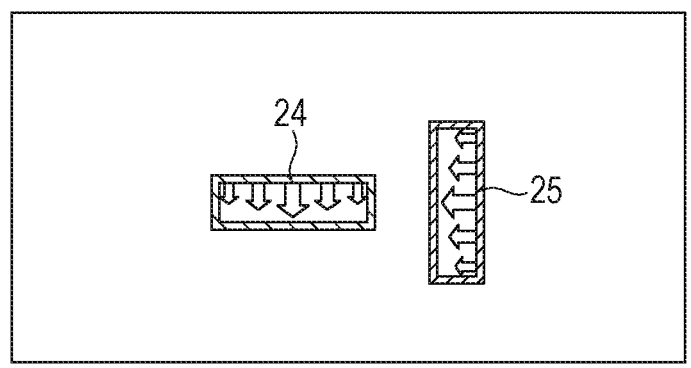
FIG. 3A is a cross-sectional view illustrating a relationship between the orientations of electric fields of signals in a transmitter-side waveguide and a receiver-side waveguide each having a rectangular cross-section shape.

FIG. 3A illustrates a relationship between the orientations of electric fields of signals in the waveguide 24 on the transmitter side and the waveguide 25 on the receiver side of the first communication device 20 when each of the waveguides 24 and 25 has a rectangular cross-section shape. While a description is given here of the structure of the first communication device 20, the same applies to that of the waveguide 34 on the transmitter side and the waveguide 35 on the receiver side of the second communication device 30. As illustrated in FIG. 3A, waveguides with a rectangular cross-section shape have a uniform orientation of electric fields of signals, thus easily ensuring isolation. Accordingly, in a case where the waveguide 24 on the transmitter side and the waveguide 25 on the receiver side have a rectangular cross-section shape, the distance between the waveguides (or transmission paths) is shorter than that in a case where the waveguide 24 on the transmitter side and the waveguide 25 on the receiver side have any other shape, which is advantageous for the reduction in the size of the first communication device 20.

Figure 3B:
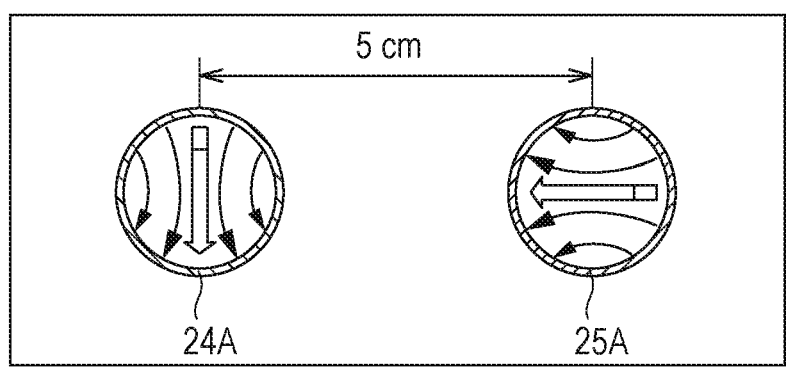
FIG. 3B is a cross-sectional view illustrating a relationship between the orientations of electric fields of signals in a transmitter-side waveguide and a receiver-side waveguide each having a circular cross-section shape.

While a waveguide having a rectangular cross-section shape has been described by way of example, this is not intended to be limiting. As an alternative, a waveguide having a circular cross-section shape, that is, a circular waveguide that transmits circular polarization, may be used. In the case of a circular waveguide, similarly to a rectangular waveguide, waveguides are arranged so that electric fields of signals in a transmitter-side transmission path and a receiver-side transmission path are oriented orthogonal to each other. FIG. 3B illustrates a relationship between the orientations of electric fields of signals in the waveguide 24 on the transmitter side and the waveguide 25 on the receiver side of the first communication device 20 when each of the waveguides 24 and 25 has a circular cross-section shape. In FIG. 3B, the transmitter-side waveguide and the receiver-side waveguide are illustrated as circular waveguides 24A and 25A to distinguish them from the rectangular waveguides 24 and 25, respectively.

As a result of the inventor's experiment, the following experiment results were observed for isolation for the circular waveguides 24A and 25A. When the first communication device 20 and the second communication device 30 communicated with each other in such a manner that the communication devices are brought into contact with each other under conditions where, for example, the plastic plates 21A and 31A of the housings 21 and 31 had a thickness of 2 mm and the circular waveguides 24A and 25A had a diameter of 3.6 mm, it was possible to ensure isolation with the distance between the circular waveguides 24A and 25A being approximately 5 cm. By including the circular waveguides 24A and 25A as waveguides (or transmission paths), the communication system 10 according to this embodiment, that is, the communication system 10 for millimeter wave communication (or transmission), will be capable of achieving the inner diameters of the waveguides on the order of mm, which is suitable for use in communication between small communication devices (or apparatuses).

In contrast, the rectangular waveguides 24 and 25 have a uniform orientation of electric fields of signals, thus ensuring isolation. Thus, the distance between the rectangular waveguides 24 and 25 will be shorter than that between the circular waveguides 24A and 25A. Accordingly, the first communication device 20 and the second communication device 30 including the rectangular waveguides 24 and 25 as a transmitter-side waveguide and a receiver-side waveguide may contribute to the smaller size of the housings 21 and 31 and therefore may make the communication system 10 according to this embodiment more compact than those including the circular waveguides 24A and 25A.

Modifications of Embodiment

The foregoing embodiment has been described in the context of two-way communication in which each of the first communication device 20 and the second communication device 30 has a transmitter-side transmission path and a receiver-side transmission path as transmission paths on a plurality of channels, ensuring that the transmitter-side transmission path and the receiver-side transmission path are isolated from each other. This is merely an example. The techniques disclosed herein may also be applied to one-way communication from the first communication device 20 to the second communication device 30 or in one-way communication from the second communication device 30 to the first communication device 20, in which there are transmission paths on a plurality of channels, in order to ensure that the transmission paths on the plurality of channels, in particular, adjacent transmission paths, are isolated from each other.

Furthermore, in the foregoing embodiment, by way of example, a transmission path in each of the first communication device 20 and the second communication device 30 has a waveguide structure including a waveguide. However, the transmission path is not limited to that having a waveguide structure including a waveguide, and any other transmission path may be used. A transmission path in each of the first communication device 20 and the second communication device 30 may be constructed by using, for example, an antenna in place of a waveguide.

Specific Example of Communication System According to Embodiment

The first communication device 20 and the second communication device 30 may be used in the following combination. Note that the following combination is an example for illustrative purposes only, and such a combination should not be construed as being limiting in any way.

In a case where the second communication device 30 is a battery-driven device such as a mobile phone, a digital camera, a video camera, a game device, or a remote control, the first communication device 20 may be a battery charger or a device that performs image processing, called a base station. In a case where the second communication device 30 is designed with a comparatively thin, integrated circuit (IC) card shaped appearance, the first communication device 20 may be a card reader/writer. A card reader/writer may further be available for use in combination with an electronic device body such as a digital recorder/player, a terrestrial television receiver, a mobile phone, a game device, or a computer.

Figure 4:
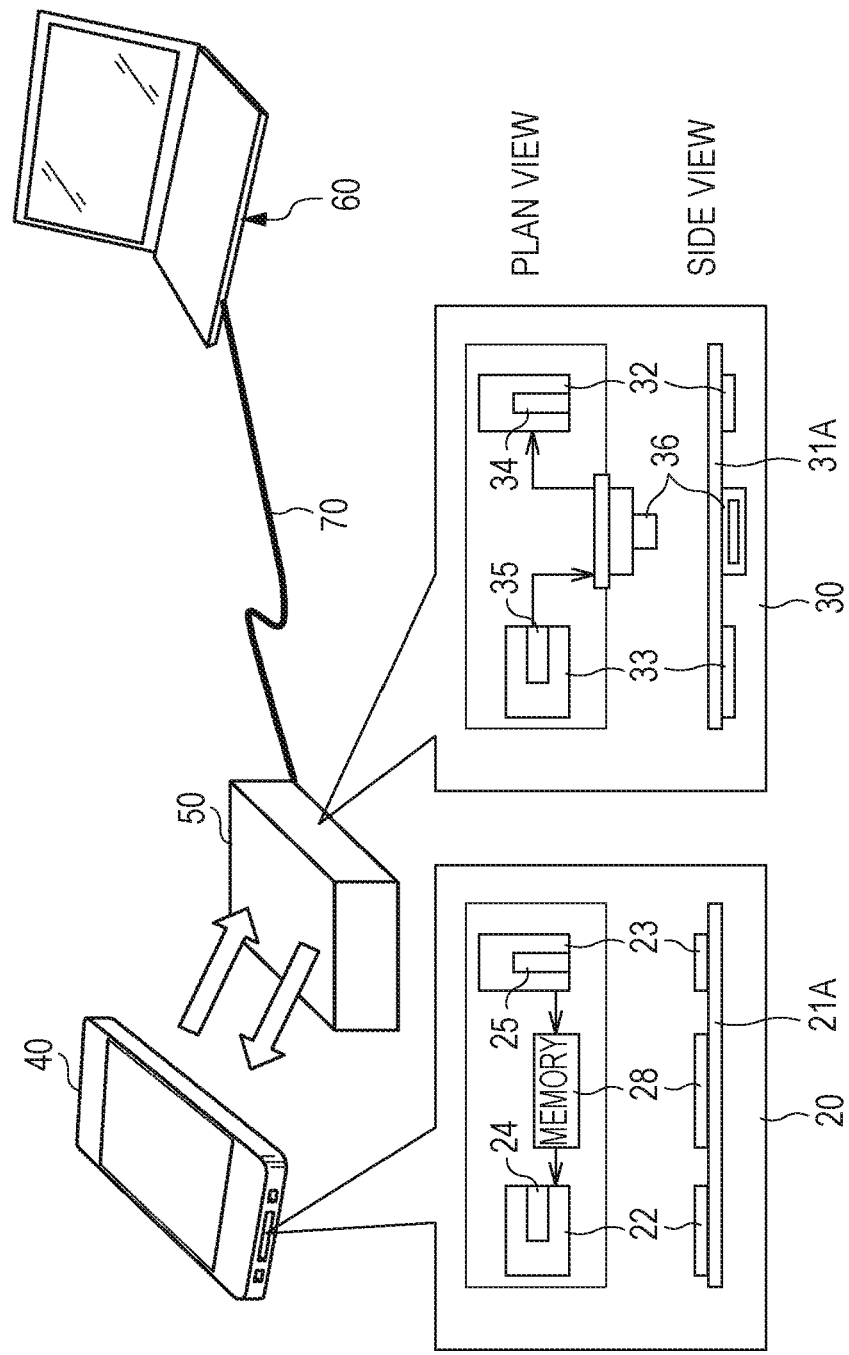
FIG. 4 is a system configuration diagram illustrating a specific example of the communication system according to the embodiment of the present disclosure.

FIG. 4 is a system configuration diagram illustrating a specific example of a communication system according to an embodiment of the present disclosure. The communication system according to this specific example has a system configuration in which two-way communication (or two-way transmission) is performed between a mobile terminal device 40 such as a smartphone (or a multi-function mobile phone) and a personal computer (PC) 60 via a relay device 50 such as a plastic connector. Correspondence relationships between the communication system according to this specific example and the communication system according to the embodiment described above will be described. The mobile terminal device 40 corresponds to the first communication device 20, and the relay device 50 corresponds to the second communication device 30. In the communication system according to this specific example, the relay device 50 and the mobile terminal device 40 communicate with each other in such a manner that, for example, the bottom surface of the mobile terminal device 40 is brought into contact with or in close proximity to the top surface of the relay device 50.

The mobile terminal device 40 corresponding to the first communication device 20 includes a USB memory 28 complying with, for example, USB 3.0 in addition to the transmitting unit 22, the receiving unit 23, and the waveguides 24 and 25. In the illustrated example, the waveguides 24 and 25 are implemented as, for example, circular waveguides (or circular polarization waveguides) that are arranged so that the electric fields of signals in the waveguides 24 and 25 are oriented orthogonal to each other. The mobile terminal device 40 and the relay device 50 perform two-way transmission of, for example, 5 Gbps by using millimeter-wave band signals. Specifically, in the mobile terminal device 40, the transmitting unit 22 transmits data stored in the USB memory 28 to the relay device 50, and the receiving unit 23 receives data transmitted from the relay device 50 and stores the received data in the USB memory 28.

On the other hand, the relay device 50 corresponding to the second communication device 30 includes a USB connector 36 in addition to the transmitting unit 32, the receiving unit 33, and the waveguides 34 and 35. Similarly to the mobile terminal device 40, the waveguides 34 and 35 are implemented as circular waveguides that are arranged so that electric fields of signals in the waveguides 34 and 35 are oriented orthogonal to each other. A USB cable 70 is connected between the USB connector 36 and the personal computer 60.

The relay device 50 relays the transmission of data between the mobile terminal device 40 and the personal computer 60. Specifically, in the relay device 50, the receiving unit 33 receives data transmitted from the mobile terminal device 40, and the received data is transmitted to the personal computer 60 through the USB connector 36 and the USB cable 70. In the relay device 50, furthermore, the transmitting unit 32 transmits data input from the personal computer 60 via the USB cable 70 and the USB connector 36 to the mobile terminal device 40.

As described above, in a communication system in which the mobile terminal device 40 and the relay device 50 perform two-way communication using millimeter-wave band signals, electric fields of signals in a transmitter-side transmission path and a receiver-side transmission path are oriented orthogonal to each other. This ensures that the transmission paths are isolated from each other without using any special member. This ensures the flatness of the planar surfaces of the housings of the mobile terminal device 40 and the relay device 50, achieving communication in such a manner that, for example, the bottom surface of the mobile terminal device 40 is brought into contact with or in close proximity to the top surface of the relay device 50.

The embodiments of the present disclosure may also provide the following configurations.

(1) A communication device including:
transmission paths on a plurality of channels, operable to transmit a signal between the communication device and a communication partner device in communication with the communication device in such a manner that the communication device and the communication partner device are brought into contact with or in close proximity to each other,
wherein electric fields of signals in the transmission paths on the plurality of channels are oriented orthogonal to each other.

(2) The communication device according to (1), wherein electric fields of signals in adjacent transmission paths among the transmission paths on the plurality of channels are oriented orthogonal to each other.

(3) The communication device according to (1) or (2), wherein the communication device has a housing having a planar surface, and
wherein the communication device communicates with the communication partner device in such a manner that the planar surface of the housing of the communication device is brought into contact with or in close proximity to a planar surface of a housing of the communication partner device.

(4) The communication device according to (3), wherein the housing of the communication device is formed of a dielectric material.

(5) The communication device according to (4), wherein the housing of the communication device is formed of a plastic material.

(6) The communication device according to any one of (1) through (5), wherein the transmission paths on the plurality of channels are waveguides.

(7) The communication device according to (6), wherein each of the waveguides has a rectangular cross-section shape.

(8) The communication device according to (6), wherein each of the waveguides has a circular cross-section shape.

(9) The communication device according to any of (1) through (8), wherein the transmission paths on the plurality of channels include transmission paths on at least two channels including a transmitter-side transmission path and a receiver-side transmission path, and
wherein the communication device performs two-way communication with the communication partner device.

(10) The communication device according to (9), wherein electric fields of signals in the transmitter-side transmission path and the receiver-side transmission path are oriented orthogonal to each other.

(11) The communication device according to any one of (1) through (10), wherein the communication device communicates with the communication partner device using a high-frequency signal.

(12) The communication device according to (11), wherein the communication device communicates with the communication partner device using a millimeter-wave band signal.

(13) A communication system including:
a first communication device; and
a second communication device,
the first communication device and the second communication device being configured to communicate with each other over transmission paths on a plurality of channels in such a manner that the first communication device and the second communication device are brought into contact with or in close proximity to each other,
wherein electric fields of signals in the transmission paths on the plurality of channels are oriented orthogonal to each other.

(14) A communication method including:
communicating a first communication device and a second communication device over transmission paths on a plurality of channels in such a manner that the first communication device and the second communication device are brought into contact with or in close proximity to each other,
wherein electric fields of signals in the transmission paths on the plurality of channels are oriented orthogonal to each other.

It should be understood by those skilled in the art that various modifications, combinations, sub-combinations and alterations may occur depending on design requirements and other factors insofar as they are within the scope of the appended claims or the equivalents thereof.

What is claimed is:
1. A communication device comprising:
a housing;
a transmitter disposed within the housing;
a receiver disposed within the housing; and
a plurality of waveguides disposed within the housing, the plurality of waveguides including a first waveguide configured to propagate an electric field of a first signal in a first orientation from the transmitter to a communication partner device when the communication device and the communication partner device are brought into contact with or in close proximity to each other, and a second waveguide configured to propagate an electric field of a second signal in a second orientation to the receiver from the communication partner device when the communication device and the communication partner device are brought into contact with or in close proximity to each other, wherein the second orientation is different than the first orientation.

2. The communication device according to claim 1, wherein the first waveguide and the second waveguide are adjacent waveguides in the plurality of waveguides.

3. The communication device according claim 1, wherein the first orientation is orthogonal to the second orientation.

4. The communication device according to claim 1, wherein the housing has a planar surface, and wherein the communication device communicates with the communication partner device in such a manner that the planar surface of the housing of the communication device is brought into contact with or in close proximity to a planar surface of a housing of the communication partner device.

5. The communication device according to claim 1, wherein the housing is formed of a dielectric material.

6. The communication device according to claim 1, wherein the housing is formed of a plastic material.

7. The communication device according to claim 1, wherein the each of the plurality of waveguides has a rectangular cross-section shape.

8. The communication device according to claim 1, wherein the each of the plurality of waveguides has a circular cross-section shape.

9. The communication device according to claim 1, wherein the plurality of waveguides are transmission paths on at least two channels, wherein the first waveguide is a transmitter-side transmission path, wherein the second waveguide is a receiver-side transmission path, and wherein the communication device performs two-way communication with the communication partner device.

10. The communication device according to claim 1, wherein at least one of the first signal or the second signal is a high-frequency signal.

11. The communication device according to claim 10, wherein the at least one of the first signal or the second signal is a millimeter-wave band signal.

12. The communication device according claim 1, wherein the communication partner device is a relay device electrically connected to a computing device.

13. A communication system comprising:
a first communication device; and
a second communication device including,
a housing;
a transmitter disposed within the housing;
a receiver disposed within the housing; and
a plurality of waveguides disposed within the housing, the plurality of waveguides including
a first waveguide configured to propagate an electric field of a first signal in a first orientation from the transmitter to the first communication device when the first communication device and the second communication device are brought into contact with or in close proximity to each other, and a second waveguide configured to propagate an electric field of a second signal in a second orientation from the first communication device to the receiver when the first communication device and the second communication device are brought into contact with or in close proximity to each other, wherein the second orientation is different than the first orientation.

14. The communication system according claim 13, wherein the first orientation is orthogonal to the second orientation.

15. The communication system according claim 13, wherein the first communication device includes
a housing;
a transmitter disposed within the housing;
a receiver disposed within the housing; and
a plurality of waveguides disposed within the housing, the plurality of waveguides including
a first waveguide configured to propagate the electric field of the first signal in the first orientation to the receiver when the first communication device and the second communication device are brought into contact with or in close proximity to each other, and a second waveguide configured to propagate the electric field of the second signal in the second orientation from the transmitter when the first communication device and the second communication device are brought into contact with or in close proximity to each other.

16. The communication system according to claim 15, wherein the housing of the second communication device has a planar surface, and wherein the second communication device communicates with the first communication device in such a manner that the planar surface of the housing of the second communication device is brought into contact with or in close proximity to a planar surface of the housing of the first communication device.

17. The communication system according to claim 13, wherein the housing of the second communication device is formed of a dielectric material.

18. The communication system according to claim 13, wherein the housing of the second communication device is formed of a plastic material.

19. The communication system according claim 13, wherein the first communication device is a relay device electrically connected to a computing device, and wherein the second communication device is a mobile communication device.

20. A communication method comprising:
propagating, with a first waveguide of a first communication device, an electric field of a first signal in a first orientation from a transmitter of the first communication device to a second communication device;

propagating, with a second waveguide of the first communication device, an electric field of a second signal in a second orientation from the transmitter to the second communication device, the second orientation being different from the first orientation;

propagating, with a third waveguide of the second communication device, the electric field of the first signal in the first orientation to a receiver of the second communication device; and propagating, with a fourth waveguide of the second communication device, the electric field of the second signal in the second orientation to the receiver.

21. The communication method according claim 20, wherein the first orientation is orthogonal to the second orientation.

* * * * *